Patented July 14, 1953

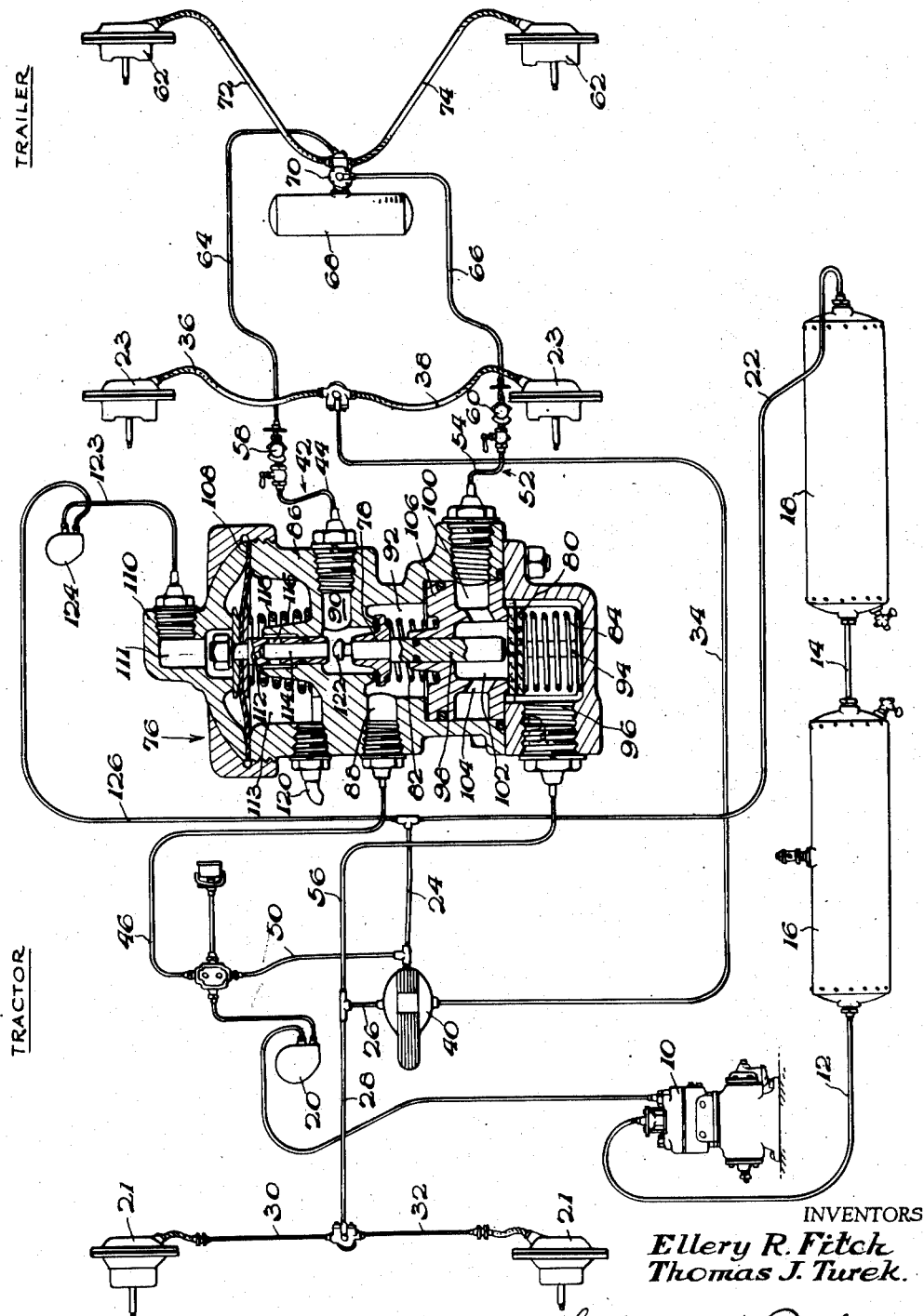

2,645,308

UNITED STATES PATENT OFFICE 2,645,308

TRACTOR PROTECTION VALVE FOR BRAKING SYSTEMS

Ellery R. Fitch and Thomas J. Turek, Elyria, Ohio, assignors to Bendix-Westinghouse Automotive Air Brake Company, Elyria, Ohio, a corporation of Delaware Application June 21, 1949, Serial No. 100,498

7 Claims. (Cl. 188—3)

This invention relates to fluid pressure braking systems for tractor-trailer vehicles and more particularly to an arrangement for conserving fluid pressure on the tractor for braking operations, notwithstanding the occurrence of a break or leak in various of the brake lines on the vehicles.

In the conventional fluid pressure braking systems for tractor-trailer vehicles, the tractor and trailer brake systems have been so connected that the trailer reservoir is always in communication with the tractor reservoir through an emergency line in order that the former may be constantly charged with fluid pressure. An emergency valve on the trailer functions to automatically apply the trailer brakes upon a severe leak in the emergency line, usually caused by the trailer breaking away from the tractor. When such a condition occurs, the fluid pressure in the tractor reservoir is rapidly depleted through the broken line, thus causing great difficulty in applying the tractor brakes. Severe leakage or rupture of other lines on the vehicles may likewise bleed the source of fluid pressure on the tractor to such an extent as to result in braking pressures which are insufficient for effecting braking. While various arrangements have been proposed for correcting these difficulties, it has been found that they are not entirely satisfactory due to the complicated nature of their construction, and to the fact that in certain instances, they may interfere with the normal functioning of the braking system.

Accordingly, the principal object of the present invention is to provide a fluid pressure braking system for tractor-trailer vehicles which is so constituted as to avoid the objections and disadvantages referred to above.

Another object is to provide in a fluid braking system for tractor-trailer vehicles, a novel arrangement for conserving the fluid pressure on the tractor in the event of a severe leak or breakage in certain of the brake lines on the vehicles, thus enabling the tractor to be efficiently braked, even though the vehicles have become separated.

A further object is to provide a novel valve mechanism carried by the tractor and so arranged as to automatically cut off communication between the emergency and service lines connecting the two vehicles in the event of a severe leak or break in either of their lines, and to restore said communication automatically after repairs to leaking or broken lines have been made.

Still another object resides in the provision of a novel construction for controlling the operation of the aforesaid valve mechanism in accordance with variations in pressure of the source of fluid pressure on the tractor, the arrangement being such that when the pressure at the source reaches a predetermined low value, communication between the emergency and service lines connecting the vehicle braking systems is automatically interrupted.

A still further object comprehends the provision of a relatively simple construction for accomplishing the foregoing and one which does not interfere with the normal operation of the brake systems on the two vehicles.

Other objects and novel features of the invention will appear more fully hereinafter from the following detailed description when taken in connection with the accompanying drawing illustrative of one form of the invention. It is to be expressly understood however, that the drawing is utilized for purposes of illustration only and is not to be taken as a definition of the limits of the the invention, reference being had for this purpose to the appended claims.

Referring to the drawing, the single figure diagrammatically illustrates the present invention in connection with a tractor-trailer braking system, certain of the parts being shown in section.

As shown, the present invention is utilized in connection with a tractor-trailer braking system of a well-known air-pressure operated type. More particularly, the tractor braking system includes a compressor 10 for supplying compressed air through conduits 12 and 14 to a pair of serially connected reservoirs 16 and 18, the loading and unloading of the compressor being preferably controlled by a governor 20 which may be constructed as shown in the patent to B. S. Aikman, No. 1,754,218 dated April 15, 1930. Front and rear brake chambers 21 and 23 are provided for applying the tractor brakes and these chambers may be supplied with air pressure from the reservoir 18 through conduits 22, 24, 26, 28, 30, 32, 34, 36 and 38, a suitable pedal-operated brake valve 40, which may be constructed as shown in the patent to W. J. Andres et al., No. 2,133,275 dated October 18, 1938, being associated with the conduits 24, 26 and 34, for controlling the degree of brake application.

In order to provide suitable connections for the trailer braking system, the tractor braking system includes an emergency line 42 comprising conduits 44, 46 and 50, as well as a service line 52 which includes conduits 54 and 56. The emergency and service lines 42 and 52 terminate in coupling parts of well known construction which are adapted to be coupled with similar parts associated with the trailer braking system in order to provide releasable couplings 58 and 60.

The trailer braking system includes a plurality of brake chambers 62, an emergency line 64, a service line 66 and a trailer reservoir 68, all of the foregoing being interconnected through a relay-emergency valve 70 of any suitable type, as for example, that shown in the patent to S. Johnson, Jr., No. 2,018,212 dated October 22, 1935. The operation of the valve 70 is such that it normally connects the emergency line 64 with the reservoir 68 to maintain the latter charged with air pressure from the tractor reservoir 18 and also connects the trailer reservoir 68 with the brake chambers 62 through conduits 72 and 74 whenever the service line 66 is charged through operation of the tractor brake valve 40. Also, in the event of a brake in the emergency line 64, as for example during a brake-in-two of the vehicles, the valve 70 would function to supply air pressure to the brake chambers 62 from the reservoir 68 to effect an emergency application of the trailer brakes.

From the foregoing, it will be appreciated that in operation, should the vehicles become separated, or should a severe leak occur in the emergency or service lines of either vehicle, the air pressure supply in the tractor reservoir may be depleted so rapidly as to prevent efficient application of the tractor brakes. The present invention overcomes this difficulty in a manner which will appear more fully hereinafter.

In its broader aspect, the present invention includes an arrangement for interrupting the communication between the tractor and trailer emergency and service lines in the event that the tractor reservoir pressure drops to a predetermined value. More particularly, the arrangement comprises a tractor protection valve device 76 that includes check valves 78 and 80 which are respectively positioned in the tractor emergency and service lines 42 and 52 and which are arranged to be closed by springs 82 and 84 in the direction of air flow. As shown, the valve device 76 comprises a body 86 provided with emergency inlet and outlet connections 88 and 90 which are respectively connected with the conduits 46 and 44, the emergency check valve 78 being positioned in an inlet chamber 92 and normally urged by the spring 82 to a position where communication between the inlet connection 88 and the outlet connection 90 is interrupted. At its lower end, the body 86 is provided with an inlet chamber 94 which communicates with the conduit 56 by way of an inlet connection 96. The service check valve 80 and the spring 84 are positioned within the chamber 94, and as has heretofore been pointed out, the action of the spring 84 is such as to tend to close the valve 80 in the direction of air flow in order to interrupt communication between conduits 56 and 54. When valve 80 is opened, by stem 98, conduits 56 and 54 are connected by way of inlet connection 96 and chamber 94, the latter communicating with an outlet connection 100 by way of bore 102 and ducts 104 formed in a spool member 106. The stem 98 is rigidly attached to the emergency check valve 78 for the purpose of obtaining the effect of both springs 82 and 84 in overcoming the frictional resistance of the stem O ring and the bore between chamber 92 and bore 102.

A novel arrangement is provided by the invention for controlling the operation of the check valves 78 and 80 in accordance with variations in the tractor reservoir pressure. As shown, such arrangement includes a diaphragm 108 which is clamped between the body 86 and a cap 110 and which forms a diaphragm chamber 111 and an exhaust chamber 113, respectively positioned above and beneath the diaphragm 108 at the upper portion of the valve device 76. A valve actuating element 112 is secured to the diaphragm 108 and is formed with a bore 114 which communicates at all times with the exhaust chamber 113 through a plurality of openings 116. With the parts in the position shown, a diaphragm spring 118 is effective to move the diaphragm 108 and element 112 upwardly to connect the emergency line 42 to an atmospheric port 120 by way of the outlet 90, bore 114, openings 116 and the exhaust chamber 113. Under these conditions, the emergency check valve 78 and the service check valve 80 are closed. However, when the diaphragm 108 is moved downwardly against the action of the spring 118, the atmospheric connection of the emergency line 42 is cut off, as shown, since the lower end of the element 112 engages an exhaust valve 122 which is carried by the emergency check valve 78. Continued downward movement of the diaphragm 108 and the element 112 effects an opening of the emergency and service check valves 78 and 80 against the action of their respective springs.

In order to control the action of the diaphragm 108, the diaphragm chamber 111 is connected with the tractor reservoir 18 through conduit 123, governor 124, conduit 126 and conduit 22. The governor 124 is preferably like the governor 20 and is set to cut-out and cut-in at any predetermined desirable range. In practice, it has been determined that excellent results are obtained with a 50 p. s. i. cut-in pressure and a 75 p. s. i. cut-out pressure. It will be understood however, that this range is by way of example only, and that other pressures may be employed if desired. The 25 p. s. i. differential between the cut-out and cut-in pressures is sufficient to permit the tractor and trailer reservoirs 18 and 68 to equalize and still keep the equalizing pressure above the 50 p. s. i. cut-in pressure.

In operation, and assuming that the parts occupy the positions illustrated, with no air in the system, it will be seen that the emergency and service valves 78 and 80 are closed and that the emergency line 42 is connected with the atmospheric port 120. Under these conditions, the trailer brakes 62 are automatically connected with the trailer reservoir through the relay-emergency valve 70. As the air pressure is built up in the tractor reservoir 18, through operation of the compressor 10, the valve device 76 will remain in its illustrated position until the pressure in the reservoir 18 has reached the 75 p. s. i. cut-out pressure. At this pressure the governor 124 cuts out and connects conduits 123 and 126, thus delivering air to the diaphragm chamber 111 at 75 p. s. i., and causing the diaphragm 108 to move downwardly. This action closes the exhaust valve 122 and opens the emergency and service valves 78 and 80 against the action of their respective springs 82 and 84, thus interconnecting the vehicle emergency lines 42 and 64 to allow the trailer reservoir pressure to build up, as well as interconnecting the vehicle service lines 52 and 66.

When the system is in operation, with all reservoirs fully charged to a value of 105 p. s. i., for example, it will be readily understood that so long as the pressure in the tractor reservoir 18 is above the 50 p. s. i. cut-in pressure of the governor 124, the operation of the tractor and trailer brakes in service is under the complete control of the operator through the brake valve 40. In the event however, of leakage from the tractor reservoir, due to any broken line on either vehicle, of such extent as to cause the tractor reservoir pressure to drop to the 50 p. s. i. cut-in pressure, it will be understood that in such event the governor 124 will operate to cut off the conduit 126 and to connect the conduit 123 with an atmospheric port at the governor. This action exhausts the diaphragm chamber 111, permitting the diaphragm 108 and element 112 to move upwardly to connect the emergency line 42 with the atmospheric port 120, and permitting the emergency and service valves 78 and 80 to close in the direction of air flow. Opening of the emergency line 42 causes an emergency application of the trailer brakes by reason of the operation of the relay-emergency valve 70, while closure of the emergency and service valves 78 and 80 prevents any further loss of air pressure from the tractor reservoir. Hence the pressure in the tractor braking system is conserved between 50 and 75 p. s. i., the respective cut-in and cut-out pressures of the governor 124.

Should the trailer emergency line break or develop a severe leak, the pressure in such line will exhaust and cause an emergency application of the trailer brakes by reason of the automatic operation of the relay-emergency valve 70. Since the emergency valve 78 is open, the pressure in the tractor reservoir 18 will bleed down through the break until the 50 p. s. i. cut-in pressure of the governor 124 has been reached. At this point, the governor 124 functions to exhaust the diaphragm chamber 111 of the valve device 76 and the emergency and service valves 78 and 80 will close in order to conserve the tractor reservoir pressure.

In the event that the trailer service line 66 should break or develop a severe leak, a brake application by the operator which would reduce the tractor reservoir pressure through the broken line to the 50 p. s. i. cut-in pressure of the governor 124 would cause operation of the valve device 76 in the manner heretofore described to close the emergency and service valves 78 and 80. Here again the tractor reservoir pressure would be conserved between 50 and 75 p. s. i.

From the foregoing, it will be readily seen that the present invention provides a highly effective construction for conserving the air pressure in the tractor braking system, notwithstanding severe leakage from the various lines on the vehicles. Such an arrangement enables efficient braking of the tractor, in the event of a break-in-two of the coupled vehicles or in the event of a ruptured brake line.

While one embodiment of the invention has been shown and described herein, it will be readily understood by those skilled in the art that various modifications may be resorted to without departing from the spirit of the invention. Reference will therefore be had to the appended claims for a definition of the limits of the invention.

What is claimed is:

1. In a fluid pressure operated tractor-trailer braking system having interconnected tractor and trailer service and emergency lines, a source of fluid pressure on the tractor, valve means for controlling communication through said tractor and trailer emergency lines, other valve means for controlling communication through said tractor and trailer service lines, and means including a single pressure responsive element movable in one direction in response to a first predetermined pressure at said source for opening both said valve means, and movable in the opposite direction in response to a second predetermined pressure at said source, less than said first pressure, for closing both said valve means, and means controlled by movement of said element in said opposite direction for connecting the trailer emergency line to atmosphere.

2. In a fluid pressure operated tractor-trailer braking system having interconnected tractor and trailer service and emergency lines, a source of fluid pressure on the tractor, an emergency valve controlling communication through said interconnected emergency lines, a spring for closing said emergency valve in the direction of fluid flow, a service valve controlling communication through said interconnected service lines, a spring for closing said service valve in the direction of fluid flow, and means including a single pressure responsive element movable in one direction in response to a first predetermined pressure at said source for opening both said emergency and service valves and movable in the opposite direction in response to a second predetermined pressure at said source, less than said first pressure, for allowing both of said valves to close in response to the action of their respective springs, and means controlled by movement of said element in said opposite direction for connecting the trailer emergency line to atmosphere.

3. In a fluid pressure operated tractor-trailer braking system having interconnected tractor and trailer service and emergency lines, a source of fluid pressure on the tractor, an emergency valve controlling communication through said interconnected emergency lines, a spring for closing said emergency valve in the direction of fluid flow, a service valve controlling communication through said interconnected service lines, a spring for closing said service valve in the direction of fluid flow, means including a fluid pressure responsive element for controlling the opening and closing movements of both said valves, and a fluid pressure governor controlled by variations in fluid pressure at said source for conducting fluid pressure from the source to said element to open both said valves when the pressure of said source reaches a predetermined high value, and for releasing fluid pressure from said element to allow both said valves to close in response to the action of their respective springs when the pressure of said source has dropped to a predetermined low value.

4. In a fluid pressure operated tractor-trailer braking system having interconnected tractor and trailer service and emergency lines, a reservoir of fluid pressure on the tractor, a valve interposed in each of said lines for controlling communication therethrough, and means for opening and closing both of said valves comprising a diaphragm, a valve actuating element carried by the diaphragm, resilient means normally acting to move said diaphragm and element to a valve closing position, spring means acting on said valves to close the latter when the diaphragm is moved to said valve closing position, means controlled by movement of the diaphragm when moved to said valve closing position for connecting the trailer emergency line to atmosphere, and means responsive to a predetermined pressure of fluid in said reservoir for subjecting the diaphragm to said predetermined pressure to move the latter and element to a position to open both of said valves.

5. In a fluid pressure operated tractor-trailer braking system having interconnected tractor and trailer service and emergency lines, a reservoir of fluid pressure on the tractor, and valve means for controlling communication through said lines comprising a casing provided with a pair of axially aligned service and emergency inlet chambers respectively connected with the tractor service and emergency lines, service and emergency outlet ports respectively connected with the trailer service and emergency lines, a service valve within said service inlet chamber, a spring acting to normally close communication from said service inlet chamber to the service outlet port, an emergency valve within said emergency inlet chamber, a spring acting to normally close communication from said emergency inlet chamber to the emergency outlet port, means including a diaphragm movable in one direction for moving said service and emergency valves to open position and movable in the opposite direction to allow both said valves to close, and means controlled by variations in pressure of the fluid in said reservoir for controlling the movements of said diaphragm.

6. In a fluid pressure operated tractor-trailer braking system having interconnected tractor and trailer service and emergency lines, a reservoir of fluid pressure on the tractor, and valve means for controlling communication through said lines comprising a casing provided with a pair of axially aligned service and emergency inlet chambers respectively connected with the tractor service and emergency lines, service and emergency outlet ports respectively connected with the trailer service and emergency lines, a service valve within said service inlet chamber, a spring acting to normally close communication from said service inlet chamber to the service outlet port, an emergency valve within said emergency inlet chamber, a spring acting to normally close communication from said emergency inlet chamber to the emergency outlet port, means including a diaphragm movable in one direction for moving said service and emergency valves to open position and movable in the opposite direction to allow both said valves to close, and means including a fluid pressure governor controlled by variations in pressure of the fluid in said reservoir for conducting fluid pressure from the reservoir to said diaphragm to move the latter in said one direction to open the valves when the fluid pressure reaches a predetermined high value, and for releasing fluid pressure from the diaphragm to allow movement thereof in the opposite direction to allow both valves to close when the fluid pressure in the reservoir has dropped to a predetermined low value.

7. A fluid pressure operated tractor-trailer braking system having interconnected service and emergency lines, a source of fluid pressure on the tractor, a first valve in said interconnected service lines, a first spring normally closing the first valve, a second valve in said interconnected emergency lines, a second spring normally closing the second valve, means forming a fluid pressure control chamber, a pressure responsive element subjected to the fluid pressure in said control chamber and mounted for movement in opposite directions in accordance with variations of fluid pressure in said control chamber, a conduit connecting said source and control chamber, and a fluid pressure governor in said conduit for connecting said source and chamber to open both said valves through movement of said element in one direction when the pressure of said source reaches a predetermined high value, and for connecting said chamber with the atmosphere to allow both of said valves to be closed by their respective springs when the pressure of said source has dropped to a predetermined low value.

ELLERY R. FITCH.
THOMAS J. TUREK.

References Cited in the file of this patent
UNITED STATES PATENTS

| Number | Name | Date |
|---|---|---|
| 1,614,652 | Christensen | Jan. 18, 1927 |
| 2,084,707 | Robinson | June 22, 1937 |
| 2,232,883 | Neveu | Feb. 25, 1941 |
| 2,451,139 | Williams et al. | Oct. 12, 1948 |